US006157641A

United States Patent [19]

Wilford

[11] Patent Number: 6,157,641
[45] Date of Patent: Dec. 5, 2000

[54] MULTIPROTOCOL PACKET RECOGNITION AND SWITCHING

[75] Inventor: Bruce A. Wilford, Los Altos, Calif.

[73] Assignee: Cisco Technology, Inc., San Jose, Calif.

[21] Appl. No.: 08/918,505

[22] Filed: Aug. 22, 1997

[51] Int. Cl.[7] .................................................. H04L 12/28
[52] U.S. Cl. .......................................... 370/389; 370/392
[58] Field of Search ..................................... 370/389, 392, 370/393, 397, 398, 399, 400, 401, 402, 404, 466, 390; 709/238, 265, 213

[56] References Cited

U.S. PATENT DOCUMENTS

| Re. 33,900 | 4/1992 | Howson . |
|---|---|---|
| 4,131,767 | 12/1978 | Weinstein . |
| 4,161,719 | 7/1979 | Parikh et al. . |
| 4,316,284 | 2/1982 | Howson . |
| 4,397,020 | 8/1983 | Howson . |
| 4,419,728 | 12/1983 | Larson . |
| 4,424,565 | 1/1984 | Larson . |
| 4,437,087 | 3/1984 | Petr . |
| 4,438,511 | 3/1984 | Baran . |
| 4,439,763 | 3/1984 | Limb . |
| 4,445,213 | 4/1984 | Baugh et al. . |
| 4,446,555 | 5/1984 | Devault et al. . |
| 4,456,957 | 6/1984 | Schieltz . |
| 4,464,658 | 8/1984 | Thelen . |
| 4,499,576 | 2/1985 | Fraser . |
| 4,506,358 | 3/1985 | Montgomery . |
| 4,507,760 | 3/1985 | Fraser . |

(List continued on next page.)

FOREIGN PATENT DOCUMENTS

| 0 384 758 A2 | 8/1990 | European Pat. Off. . |
|---|---|---|
| 0 431 751 A1 | 6/1991 | European Pat. Off. . |
| 0 567 217 A2 | 10/1993 | European Pat. Off. . |
| WO93/.07692 | 4/1993 | WIPO . |
| WO93/07569 | 4/1993 | WIPO . |
| WO94/01828 | 1/1994 | WIPO . |
| WO95/20850 | 8/1995 | WIPO . |

OTHER PUBLICATIONS

William Stallings, Data and Computer Communications, pp. 329–333, Prentice Hall, Upper Saddle River, New Jersey 07458.

Allen, M., "Novell IPX Over Various WAN Media (IPXW AN)," Network Working Group, RFC 1551, Dec. 1993, pp. 1–22.

Becker, D., "3c589.c: A 3c589 EtherLink3 ethernet driver for linux." becker @CESDIS.gsfc. nasa.gov, May 3, 1994, pp. 1–13.

Chowdhury, et al., "Alternative Bandwidth Allocation Algorithms for Packet Video in ATM Networks," INFOCOM 1992, pp. 1061–1068.

(List continued on next page.)

*Primary Examiner*—Chi H. Pham
*Assistant Examiner*—Steven Nguyen
*Attorney, Agent, or Firm*—Swernofsky Law Group

[57] ABSTRACT

The invention provides a method and system for identifying header information in a packet header, and for switching (and otherwise operating) on the packet in response thereto. A first set of header information recognizers operate in parallel on selected words of the packet header so as to recognize a header format for the packet header and to determine header information in response to that header format. A second set of header information recognizers operates on the header information to select a set of words from the packet header which are used for lookup for treatment of the packet. The same or similar header information is located in the packet header responsive to information which determines an encapsulation type for the packet, such as packets which use the IP version 4, IP version 6, or IPX protocols. The header information can include the destination address for the packet, or some combination of the destination address and additional information; the additional information can include the sending address, the input interface, a number of bits matched for the destination address, or some combination thereof.

16 Claims, 5 Drawing Sheets

U.S. PATENT DOCUMENTS

| | | |
|---|---|---|
| 4,532,626 | 7/1985 | Flores et al. . |
| 4,644,532 | 2/1987 | George et al. . |
| 4,646,287 | 2/1987 | Larson et al. . |
| 4,677,423 | 6/1987 | Benvenuto et al. . |
| 4,679,189 | 7/1987 | Olson et al. . |
| 4,679,227 | 7/1987 | Hughes-Hartogs . |
| 4,723,267 | 2/1988 | Jones et al. . |
| 4,731,816 | 3/1988 | Hughes-Hartogs . |
| 4,750,136 | 6/1988 | Arpin et al. . |
| 4,757,495 | 7/1988 | Decker et al. . |
| 4,763,191 | 8/1988 | Gordon et al. . |
| 4,769,810 | 9/1988 | Eckberg, Jr. et al. . |
| 4,769,811 | 9/1988 | Eckberg, Jr. et al. . |
| 4,771,425 | 9/1988 | Baran et al. . |
| 4,819,228 | 4/1989 | Baran et al. . |
| 4,827,411 | 5/1989 | Arrowood et al. . |
| 4,833,706 | 5/1989 | Hughes-Hartogs . |
| 4,835,737 | 5/1989 | Herrig et al. . |
| 4,879,551 | 11/1989 | Georgiou et al. . |
| 4,893,306 | 1/1990 | Chao et al. . |
| 4,903,261 | 2/1990 | Baran et al. . |
| 4,922,486 | 5/1990 | Lidinsky et al. . |
| 4,933,937 | 6/1990 | Konishi . |
| 4,960,310 | 10/1990 | Cushing . |
| 4,962,497 | 10/1990 | Ferenc et al. . |
| 4,962,532 | 10/1990 | Kasirai et al. . |
| 4,965,767 | 10/1990 | Kinoshita et al. ................... 365/49 |
| 4,965,772 | 10/1990 | Daniel et al. . |
| 4,970,678 | 11/1990 | Sladowski et al. . |
| 4,979,118 | 12/1990 | Kheradpir ................... 364/436 |
| 4,980,897 | 12/1990 | Decker et al. . |
| 4,991,169 | 2/1991 | Davis et al. . |
| 5,003,595 | 3/1991 | Collins et al. . |
| 5,014,265 | 5/1991 | Hahne et al. . |
| 5,020,058 | 5/1991 | Holden et al. . |
| 5,033,076 | 7/1991 | Jones et al. . |
| 5,034,919 | 7/1991 | Sasai et al. ................... 365/49 |
| 5,054,034 | 10/1991 | Hughes-Hartogs . |
| 5,059,925 | 10/1991 | Weisbloom . |
| 5,072,449 | 12/1991 | Enns et al. . |
| 5,088,032 | 2/1992 | Bosack . |
| 5,095,480 | 3/1992 | Fenner . |
| 5,115,431 | 5/1992 | Williams et al. . |
| 5,128,945 | 7/1992 | Enns et al. . |
| 5,136,580 | 8/1992 | Videlock et al. . |
| 5,166,930 | 11/1992 | Braff et al. . |
| 5,199,049 | 3/1993 | Wilson . |
| 5,206,886 | 4/1993 | Bingham . |
| 5,208,811 | 5/1993 | Kashio et al. . |
| 5,212,686 | 5/1993 | Joy et al. . |
| 5,224,099 | 6/1993 | Corbalis et al. . |
| 5,226,120 | 7/1993 | Brown et al. . |
| 5,228,062 | 7/1993 | Bingham . |
| 5,229,994 | 7/1993 | Balzano et al. . |
| 5,237,564 | 8/1993 | Lespagnol et al. . |
| 5,241,682 | 8/1993 | Bryant et al. . |
| 5,243,342 | 9/1993 | Kattemalalavadi et al. . |
| 5,243,596 | 9/1993 | Port et al. . |
| 5,247,516 | 9/1993 | Bernstein et al. . |
| 5,249,178 | 9/1993 | Kurano et al. . |
| 5,253,251 | 10/1993 | Aramaki . |
| 5,255,291 | 10/1993 | Holden et al. . |
| 5,260,933 | 11/1993 | Rouse . |
| 5,260,978 | 11/1993 | Fleischer et al. . |
| 5,268,592 | 12/1993 | Bellamy et al. . |
| 5,268,900 | 12/1993 | Hluchyj et al. . |
| 5,271,004 | 12/1993 | Proctor et al. . |
| 5,274,631 | 12/1993 | Bhardwaj . |
| 5,274,635 | 12/1993 | Rahman et al. . |
| 5,274,643 | 12/1993 | Fisk . |
| 5,280,470 | 1/1994 | Buhrke et al. . |
| 5,280,480 | 1/1994 | Pitt et al. . |
| 5,280,500 | 1/1994 | Mazzola et al. . |
| 5,283,783 | 2/1994 | Nguyen et al. . |
| 5,287,103 | 2/1994 | Kasprzyk et al. . |
| 5,287,453 | 2/1994 | Roberts . |
| 5,291,482 | 3/1994 | McHarg et al. . |
| 5,305,311 | 4/1994 | Lyles . |
| 5,307,343 | 4/1994 | Bostica et al. . |
| 5,309,437 | 5/1994 | Perlman et al. ................... 730/85.13 |
| 5,311,509 | 5/1994 | Heddes et al. . |
| 5,313,454 | 5/1994 | Bustini et al. . |
| 5,313,582 | 5/1994 | Hendel et al. . |
| 5,317,562 | 5/1994 | Nardin et al. . |
| 5,319,644 | 6/1994 | Liang . |
| 5,327,421 | 7/1994 | Hiller et al. . |
| 5,331,637 | 7/1994 | Francis et al. . |
| 5,345,445 | 9/1994 | Hiller et al. . |
| 5,345,446 | 9/1994 | Hiller et al. . |
| 5,353,283 | 10/1994 | Tsuchiya ................... 370/60 |
| 5,359,592 | 10/1994 | Corbalis et al. . |
| 5,361,250 | 11/1994 | Nguyen et al. . |
| 5,361,256 | 11/1994 | Doeringer et al. . |
| 5,361,259 | 11/1994 | Hunt et al. . |
| 5,365,524 | 11/1994 | Hiller et al. . |
| 5,367,517 | 11/1994 | Cidon et al. . |
| 5,371,852 | 12/1994 | Attanasio et al. . |
| 5,386,567 | 1/1995 | Lien et al. . |
| 5,390,170 | 2/1995 | Sawant et al. . |
| 5,390,175 | 2/1995 | Hiller et al. . |
| 5,394,394 | 2/1995 | Crowther et al. . |
| 5,394,402 | 2/1995 | Ross . |
| 5,400,325 | 3/1995 | Chatwani et al. . |
| 5,408,469 | 4/1995 | Opher et al. . |
| 5,416,842 | 5/1995 | Aziz . |
| 5,422,880 | 6/1995 | Heitkamp et al. . |
| 5,422,882 | 6/1995 | Hiller et al. . |
| 5,423,002 | 6/1995 | Hart . |
| 5,426,636 | 6/1995 | Hiller et al. . |
| 5,428,607 | 6/1995 | Hiller et al. . |
| 5,430,715 | 7/1995 | Corbalis et al. . |
| 5,430,729 | 7/1995 | Rahnema . |
| 5,442,457 | 8/1995 | Najafi . |
| 5,442,630 | 8/1995 | Gagliardi et al. . |
| 5,452,297 | 9/1995 | Hiller et al. . |
| 5,473,599 | 12/1995 | Li et al. . |
| 5,473,607 | 12/1995 | Hausman et al. . |
| 5,477,541 | 12/1995 | White et al. ................... 370/392 |
| 5,485,455 | 1/1996 | Dobbins et al. . |
| 5,490,140 | 2/1996 | Abensour et al. . |
| 5,490,258 | 2/1996 | Fenner . |
| 5,491,687 | 2/1996 | Christensen et al. . |
| 5,491,804 | 2/1996 | Heath et al. . |
| 5,497,368 | 3/1996 | Reijnierse et al. . |
| 5,504,747 | 4/1996 | Sweasey . |
| 5,509,006 | 4/1996 | Wilford et al. . |
| 5,517,494 | 5/1996 | Green . |
| 5,519,704 | 5/1996 | Farinacci et al. . |
| 5,519,858 | 5/1996 | Walton et al. ................... 395/600 |
| 5,526,489 | 6/1996 | Nilakantan et al. . |
| 5,530,963 | 6/1996 | Moore et al. . |
| 5,535,195 | 7/1996 | Lee . |
| 5,539,734 | 7/1996 | Burwell et al. . |
| 5,541,911 | 7/1996 | Nilakantan et al. . |
| 5,546,370 | 8/1996 | Ishikawa . |
| 5,555,244 | 9/1996 | Gupta et al. . |
| 5,561,669 | 10/1996 | Lenney et al. . |
| 5,566,170 | 10/1996 | Bakke et al. ................... 370/392 |
| 5,583,862 | 12/1996 | Callon . |
| 5,592,470 | 1/1997 | Rudrapatna et al. . |
| 5,598,581 | 1/1997 | Daines et al. . |
| 5,600,798 | 2/1997 | Cherukuri et al. . |

| | | | |
|---|---|---|---|
| 5,602,770 | 2/1997 | Ohira | 365/49 |
| 5,604,868 | 2/1997 | Komine et al. . | |
| 5,608,726 | 3/1997 | Virgile . | |
| 5,617,417 | 4/1997 | Sathe et al. . | |
| 5,617,421 | 4/1997 | Chin et al. . | |
| 5,630,125 | 5/1997 | Zellweger . | |
| 5,631,908 | 5/1997 | Saxe . | |
| 5,632,021 | 5/1997 | Jennings et al. . | |
| 5,634,010 | 5/1997 | Ciscon et al. . | |
| 5,638,359 | 6/1997 | Peltola et al. . | |
| 5,644,718 | 7/1997 | Belove et al. . | |
| 5,659,684 | 8/1997 | Giovannoni et al. . | |
| 5,666,353 | 9/1997 | Klausmeier et al. . | |
| 5,673,265 | 9/1997 | Gupta et al. . | |
| 5,678,006 | 10/1997 | Valizadeh et al. . | |
| 5,680,116 | 10/1997 | Hashimoto et al. . | |
| 5,684,797 | 11/1997 | Aznar et al. . | |
| 5,684,954 | 11/1997 | Kaiserswerth et al. | 370/393 |
| 5,687,324 | 11/1997 | Green et al. . | |
| 5,689,506 | 11/1997 | Chiussi et al. . | |
| 5,694,390 | 12/1997 | Yamato et al. . | |
| 5,724,351 | 3/1998 | Chao et al. . | |
| 5,740,097 | 4/1998 | Satoh | 365/49 |
| 5,748,186 | 5/1998 | Raman . | |
| 5,748,617 | 5/1998 | McLain, Jr. . | |
| 5,754,547 | 5/1998 | Nakazawa . | |
| 5,802,054 | 9/1998 | Bellenger . | |
| 5,802,065 | 9/1998 | Ogawa et al. | 370/394 |
| 5,835,710 | 11/1998 | Nagami et al. | 709/250 |
| 5,841,874 | 11/1998 | Kempke et al. | 380/50 |
| 5,854,903 | 12/1998 | Morrison et al. . | |
| 5,856,981 | 1/1999 | Voelker . | |
| 5,872,783 | 2/1999 | Chin | 370/392 |
| 5,892,924 | 4/1999 | Lyon | 395/200.75 |
| 5,898,686 | 4/1999 | Virgile . | |
| 5,903,559 | 5/1999 | Acharya et al. . | |
| 5,909,440 | 6/1999 | Ferguson | 370/389 |
| 5,909,686 | 6/1999 | Muller et al. | 370/401 |
| 5,917,820 | 6/1999 | Rekhter | 370/392 |
| 5,920,566 | 7/1999 | Hendel | 370/389 |
| 5,938,736 | 8/1999 | Muller | 370/392 |
| 5,949,786 | 9/1999 | Bellenger | 370/401 |

OTHER PUBLICATIONS

Doeringer, W., "Routing on Longest–Matching Prefixes," IEEE/ACM Transactions in Networking, vol. 4, No. 1, Feb. 1996, pp. 86–97.

Esaki, et al., "Datagram Delivery in an ATM–Internet," 2334b IEICE Transactions on Communications, Mar. 1994, No. 3, Tokyo, Japan.

IBM Corporation, "Method and Apparatus for the Statistical Multiplexing of Voice, Data and Image Signals," IBM Technical Disclosure Bulletin, No.6, Nov. 1992, pp. 409–411.

Pei, et al., "Putting Routing Tables in Silicon," IEEE Network Magazine, Jan. 1992, pp. 42–50.

Perkins, D., "Requirements for an Internet Standard Point–to Point Protocol," Network Working Group, RFC 1547, Dec. 1993, pp. 1–19.

Simpson, W., "The Point–to–Point Protocol (PPP), " Network Working Group, RFC 1548, Dec. 1993, pp. 1–53.

Tsuchiya, P.F., "Search Algorithm for Table Entries with Non–contiguous Wildcarding," Abstract, Bellcore.

Zhang, et al., "Rate–Controlled Static–Priority Queueing," INFOCOM 1993, pp. 227–236.

PACKET FLOW EXAMPLE

INPUT PACKET HEADER AT L2 RECOGNIZER

| HEADER STUFF | DA (6) | SA (6) | 08 00 | 45.60.02.23.D7.A2.00.00.67.06.3F.91.81.2B.25.5C.80.10.05.IF |

INPUT PACKET AT BOTTOM OF MUX, GOING INTO HASH LOOKUP

| TYPE [08] | TOS [60] | PROTOCOL [06] | SOURCE IP ADDRESS [81.2B.25.5C] | DESTINATION IP ADDRESS [80.10.05.IF] |

*FIG. 5*

MULTIPROTOCOL PACKET RECOGNITION AND SWITCHING

BACKGROUND OF THE INVENTION

1. Field of the Invention

The invention relates to packet switching.

2. Related Art

In a packet-switched network, a "router" is a device which receives packets on one or more input interfaces and which outputs those packets on one of a plurality of output interfaces, so as to move those packets within the network from a source device to a destination device. Each packet includes header information which indicates the destination device (and other information), and the router includes routing information which associates an output interface with information about the destination device (possibly with other information). The router can also perform other operations on packets, such as rewriting the packets' headers according to their routing protocol or to reencapsulate the packets from a first routing protocol to a second routing protocol. It is advantageous for routers to operate as quickly as possible, so that as many packets as possible can be switched in a unit time.

One problem which has arisen in the art is that packets can be in one of a plurality of routing protocols or encapsulations, and can therefore include header information which the router needs to switch the packet (and to perform other operations on the packet) in locations which vary from packet to packet. This requires the router to be able to locate the header information in one or more of various locations within the packet. Thus, methods by which the router might operate relatively quickly can be inflexible with regard to the location for the header information, while methods by which the router might operate flexibly with regard to the location for the header information can be relatively slow.

Some known routers, such as those described in U.S. Pat. No. 5,509,006, "Apparatus and Method for Switching Packets Using Tree Memory", issued Apr. 16, 1996, in the name of inventor Bruce A. Wilford, and assigned to cisco Systems, Inc., attorney docket number CIS-001, can determine a type for the packet and therefore the location of the header information, by examining each byte of the packet header in turn. Thus, each byte of the packet header provides information regarding interpretation of successive bytes of the packet header, and the router can determine the header information needed to switch the packet in response to the relatively early bytes of the packet header. While this method achieves the goal of being relatively flexible with regard to the location for the header information, it can take many clock cycles to determine the proper header information, and is therefore not as relatively quick as desired.

Accordingly, it would be desirable to provide a method and system for locating header information in packet headers and switching packets in response to that header information, which is both relatively quick and flexible with regard to location of the header information. This advantage is achieved in an embodiment of the invention in which header information recognizers operate in parallel on the packet header to determine the location of the header information, and the packet is switched responsive to the header information so located.

SUMMARY OF INVENTION

The invention provides a method and system for identifying header information in a packet header, and for switching (and otherwise operating on) the packet in response thereto. A first set of header information recognizers operate in parallel on the packet header so as to recognize a header format for the packet header and to determine relevant header information in response to that header format. A second set of header information recognizers operates on the header information to select one or more sets of words from the header information which are used for one or more lookups for treatment of the packet.

In a preferred embodiment, the same or similar header information is located in the packet header responsive to information which determines an encapsulation type for the packet, such as packets which use the IP version 4, IP version 6, or IPX protocols. The header information can include the destination address for the packet, or some combination of the destination address and additional information; the additional information can include the sending address, the input interface, a number of bits matched for the destination address, or some combination thereof.

BRIEF DESCRIPTION OF THE DRAWINGS

FIG. 5 shows an example input packet header before and after processing by elements of the multiprotocol packet recognizer and switcher.

DETAILED DESCRIPTION OF THE PREFERRED EMBODIMENT

In the following description, a preferred embodiment of the invention is described with regard to preferred process steps and data structures. Those skilled in the art would recognize after perusal of this application that embodiments of the invention can be implemented using general purpose processors or special purpose processors or other circuits adapted to particular process steps and data structures described herein, and that implementation of the process steps and data structures described herein would not require undue experimentation or further invention.

Inventions described herein can be used in conjunction with inventions described in the following applications:

Application Ser. No. 08/917,654, filed the same day, Express Mail Mailing No. EM266118235US, in the name of the same inventor, titled "Multiple Parallel Packet Routing Lookup", attorney docket number CIS-020B; and Application Ser. No. 08/918,506, filed the same day, Express Mail Mailing No. EM571204544US, in the name of the same inventor, titled "Enhanced Internet Packet Routing Lookup", attorney docket number CIS-020C.

Each of these applications is hereby incorporated by reference as if fully set forth herein.

System Including Multiprotocol Multipacket Recognizer and Switcher

Figure 1:
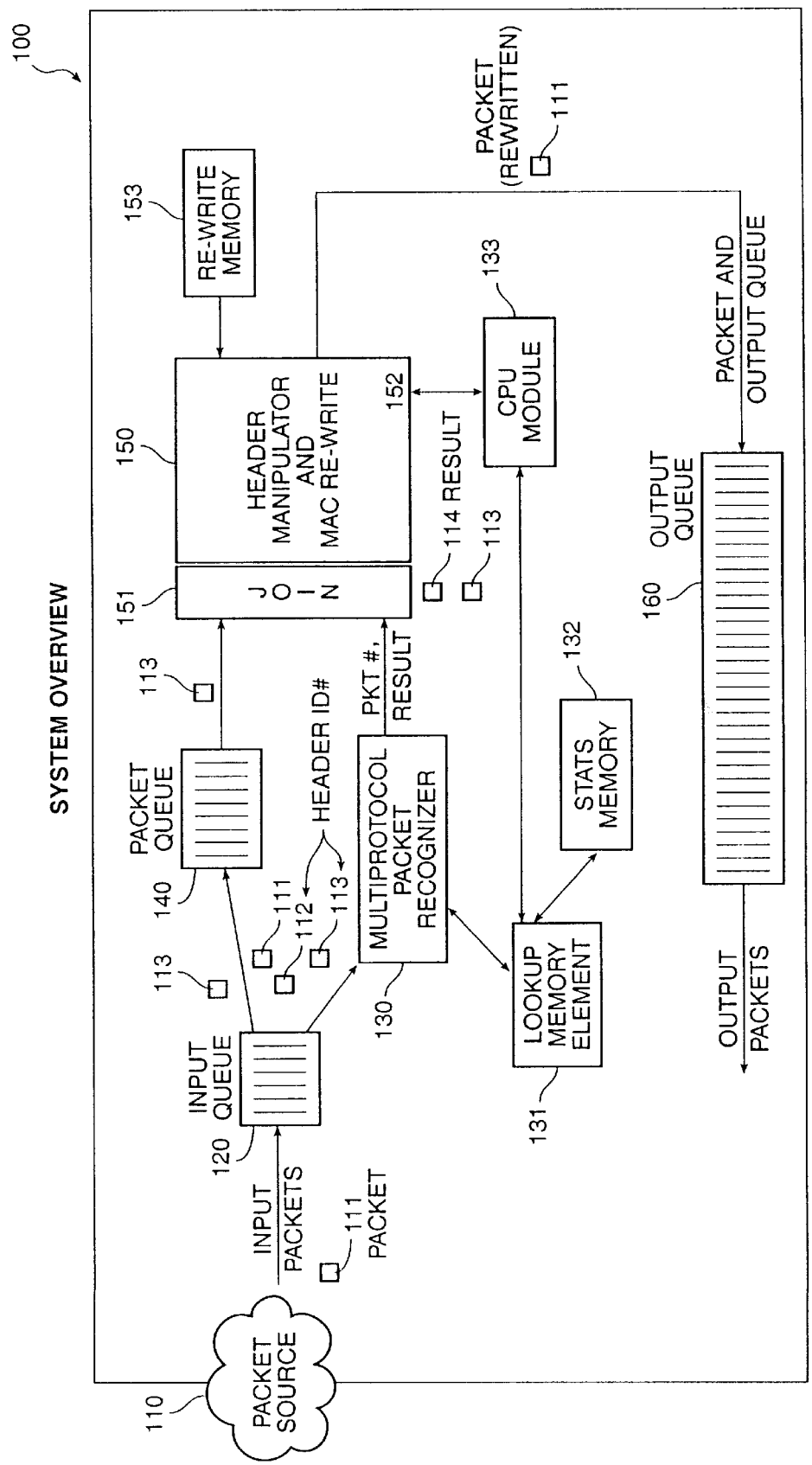
FIG. 1 shows a block diagram of a system including a multiprotocol packet recognizer and switcher.

FIG. 1 shows a block diagram of a system including a multiprotocol packet recognizer and switcher.

A system 100 includes a packet source 110, a packet input queue 120, a multiprotocol packet recognizer 130, a packet queue 140, a rewrite element 150, and a packet output queue 160.

The input queue 120 is coupled to the source 110, receives a sequence of packets 111 from the source 110, and queues them in a first-in first-out (FIFO) manner. In a preferred embodiment, the source 110 comprises a plurality of network interfaces on which packets 111 can be received.

The recognizer 130 is coupled to the input queue 120, receives packet headers 112 from the input queue 120 (along with associated packet identifiers 113), routes the associated packets 111, and transmits the identifiers 113 and associated routing results 114 for the packets 111 to the rewrite element 150. The recognizer 130 uses a lookup element 131, a statistics memory 132, and a processor 133.

The packet queue 140 is coupled to the input queue 120, receives packets 111 (along with associated identifiers 113) from the input queue 120, and transmits them to the rewrite element 150 in a first-in first-out manner.

The rewrite element 150 is coupled to the recognizer 130 and the packet queue 140. The rewrite element 150 receives packets 111 (including their headers 112), identifiers 113, and routing results 114 from the recognizer 130 and the packet queue 140.

The rewrite element 150 includes a joiner module 151, which matches the packets 111 and their routing results 114 using the identifiers 113. The rewrite element 150 also includes a rewrite module 152, which rewrites the packets 111 using the routing results 114 and using a rewrite memory 153 to generate rewritten packets 111. In a preferred embodiment, the joiner module 151 thus performs the function of reordering the packets 111 in the packet queue 140 into a routing result order before those packets 111 are rewritten by the rewrite element 150.

The output queue 160 is coupled to the rewrite element 150, receives packets 111 therefrom, and queues them for output to designated interfaces in a first-in first-out manner.

Multiprotocol Multipacket Recognizer and Switcher

Figure 2:
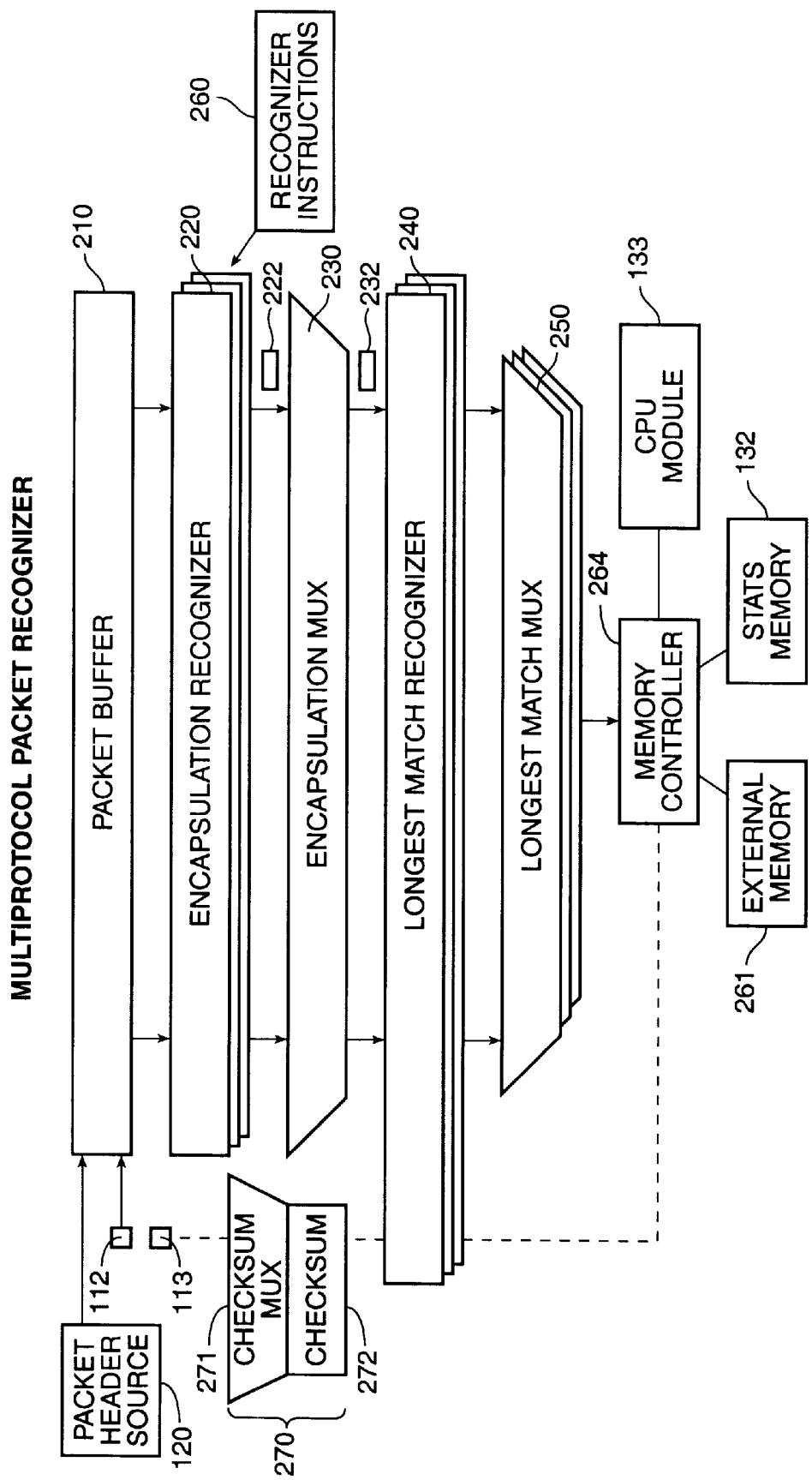
FIG. 2 shows a block diagram of a multiprotocol packet recognizer and switcher.

FIG. 2 shows a block diagram of a multiprotocol packet recognizer and switcher.

The recognizer 130 includes a packet buffer 210, a set of n encapsulation recognizers 220, an encapsulation multiplexer 230, a set of m longest-match recognizers 240, and a set of m longest-match multiplexers 250.

The packet buffer 210 is coupled to the input queue 120 and receives packet headers 112 from the input queue 120.

Figure 3:
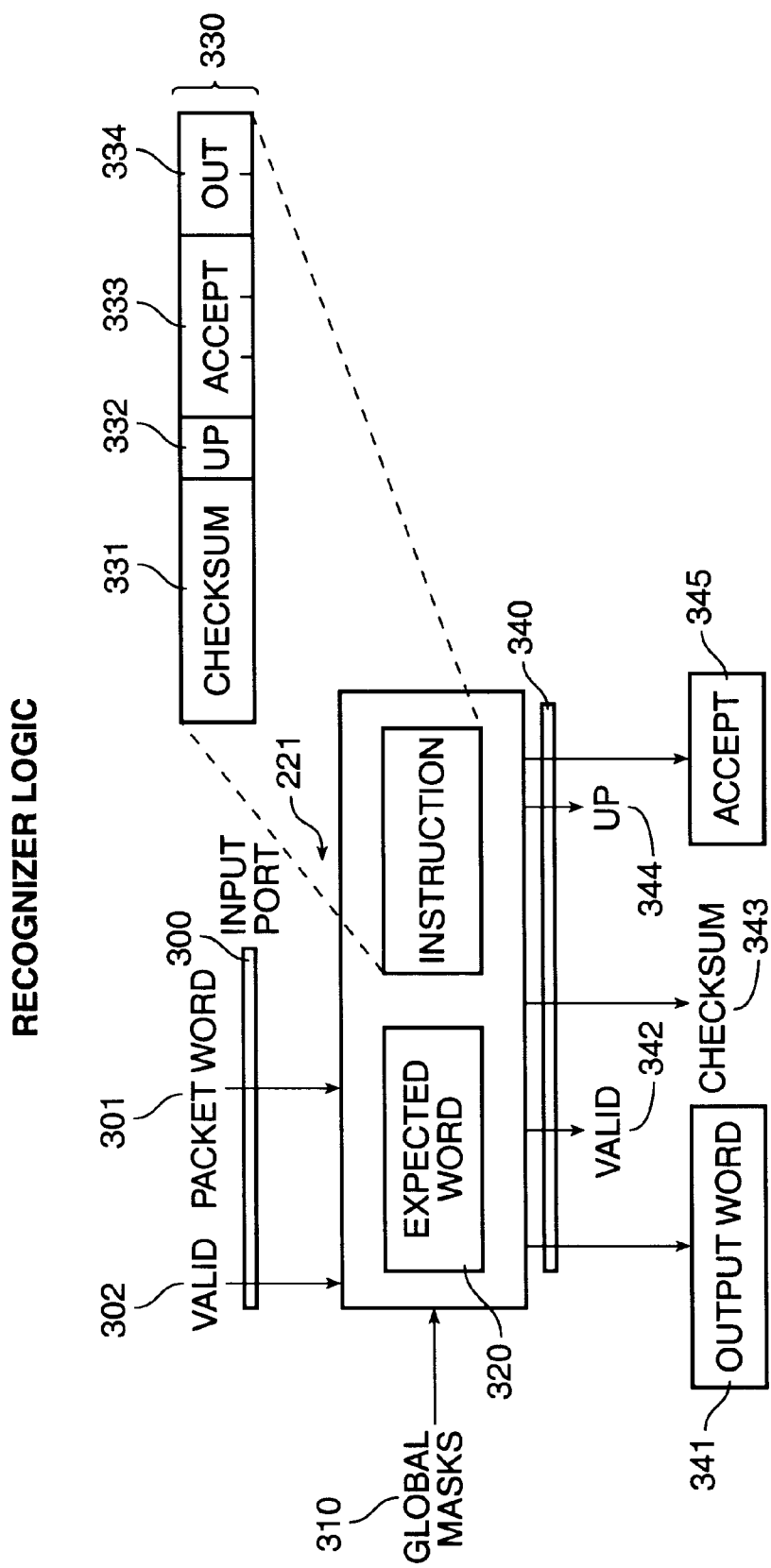
FIG. 3 shows a recognizer element for a multiprotocol packet recognizer and switcher.

Each of the n encapsulation recognizers 220 is coupled to the packet buffer 210, and includes a set of recognizer elements 221 (FIG. 3). There is one recognizer element 221 for each word of the packet buffer 210, and one or more of the recognizer elements 221 provides a recognizer output word 222. In a preferred embodiment, each word comprises one eight-bit octet or byte. The recognizer elements 221 of each encapsulation recognizer 220 use a set of recognizer instructions 260.

The recognizer elements 221 of each of the n encapsulation recognizers 220 collectively perform a bytewise comparison of the packet header 112. For each recognizer element 221, the nature of the bytewise comparison is defined by the recognizer instruction 260 for that recognizer element 221. If the comparisons by the recognizer elements 221 of a particular encapsulation recognizer 220 are successful, the recognizer elements 221 use the recognizer instructions 260 to generate one or more associated recognizer output words 222.

FIG. 5 shows an example input packet header before and after processing by elements of the multiprotocol packet recognizer and switcher.

In the example shown in FIG. 5, the packet header 112 comprises the header for an input Ethernet packet. Each of the encapsulation recognizers 220 performs a bytewise comparison of the packet header 112 with header information tag words associated with an associated header format for that particular encapsulation recognizer 220. In a preferred embodiment, there can be one or more such encapsulation recognizers 220 for each substantially different header format. Each of the encapsulation recognizers 220 thus recognizes and confirms some information such as the input interface type (which might, for example, be the value hexadecimal 01 for "Ethernet") and the longest-match protocol type (which must be the value hexadecimal 08 00 for "IP"). Each of the encapsulation recognizers 220 recognizes and discards other information such as the input interface number (which can be any value), and recognizes still other information such as the source address and destination address and generates recognizer output words 222 corresponding to those values.

The encapsulation multiplexer 230 is coupled to the one of the n encapsulation recognizers 220 which successfully matches the input packet header. The n encapsulation recognizers 220 are coupled to a priority selector, so that if more than one of encapsulation recognizers 220 successfully match the input packet header, only one of those encapsulation recognizers 220 is coupled to the encapsulation multiplexer 230.

The encapsulation multiplexer 230 includes a set of rows 410 of multiplexer elements 231 (FIG. 4); a first row 410 includes one less multiplexer element 231 than the number of recognizer output words 222 received from the encapsulation recognizer 220. The encapsulation multiplexer 230 provides a number of multiplexer output words 232 equal to the number of non-null recognizer output words 222; these multiplexer output words 232 have been coalesced by left-shifting. The multiplexer elements 231 of the encapsulation multiplexer 230 thus collectively perform a bytewise shift of all non-null recognizer output words 222 so as to eliminate null recognizer output words 222 from processing by further stages of the recognizer 130.

In the example shown in FIG. 5, there are about eight encapsulation recognizers 220, one for each of the following protocols: IP, IP multicast, TAG switching, TAG switching (multicast), IPX, CLNS, and two extra encapsulation recognizers 220 for future expansion. One of the encapsulation recognizers 220 generates a set of recognizer output words 222 corresponding to Ethernet header format, and the encapsulation multiplexer 230 collects the non-null recognizer output words 222 so as to generate a compact form of the packet header 112 which is specific to Ethernet header format. This compact form comprises a set of type information possibly equal to the value hexadecimal 08 (for example), a set of type-of-service information typically equal to the value hexadecimal 60, a set of protocol information typically equal to the value hexadecimal 06, a source IP address equal in the example shown in FIG. 5 to the value hexadecimal 81 2B 25 5C, and a destination IP address equal in the example shown in FIG. 5 to the value hexadecimal 80 10 05 1F.

Each of the m longest-match recognizers 240 is coupled to the encapsulation multiplexer 230, and includes a set of recognizer elements 221 (FIG. 3). There is one recognizer element 221 for each multiplexer output word 232, and one or more of the recognizer elements 221 provides a recognizer output word 222 (FIG. 3). The recognizer elements 221 of each of the m longest-match recognizers 240 also use the recognizer instructions 260.

Each of the m longest-match recognizers 240 is also coupled to a checksum element 270, which includes a checksum multiplexer 271 and a checksum computing element 272. The checksum multiplexer 271 is coupled to the packet buffer 210. The recognizer instructions 260 select a set of words from the packet buffer 210 for which a checksum is to be computed. The checksum computing element 272 computes the checksum from the selected words. The checksum element 270 calculates packet header checksums in parallel on the input packet header according to each of multiple header encapsulation protocols. The result of each packet header checksum is output on a separate bit. The longest-match recognizers 240 for a protocol encapsulation each check the corresponding bit for that protocol encapsulation. Protocols with header checksums, such as IP version 4 or CLNS, are therefore suitable for use with the checksum element 270.

Each of the m longest-match multiplexers 250 is coupled to a corresponding one of the m longest-match recognizers 240.

Figure 4:
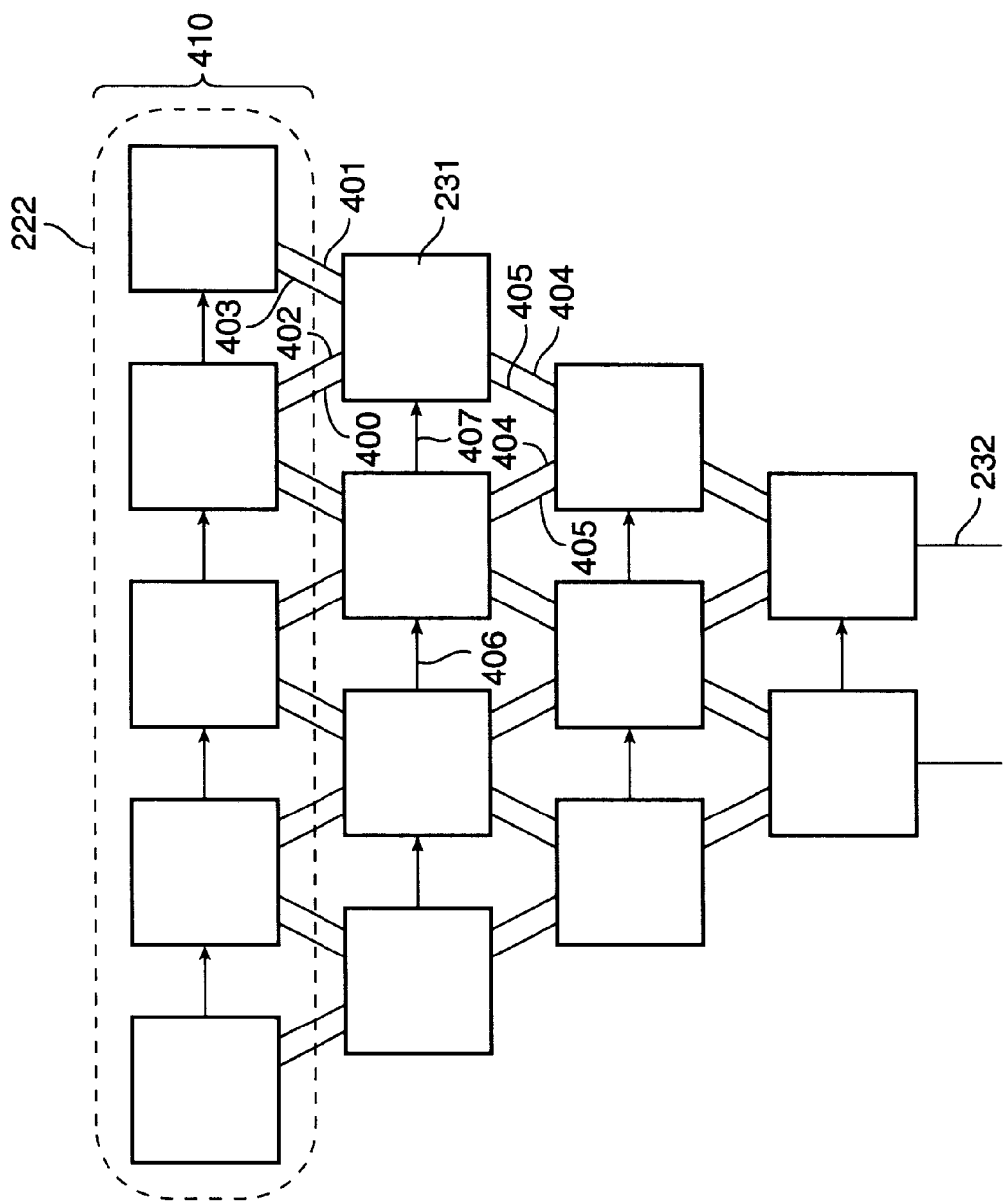
FIG. 4 shows a multiplexer element for a multiprotocol packet recognizer and switcher.

Similar to the encapsulation multiplexer 230, each one of the m longest-match multiplexers 250 includes a set of multiplexer elements 231 (FIG. 4). Similar to the encapsulation recognizer 220 and the encapsulation multiplexer 230, there is one less multiplexer element 231 than the number of recognizer output words 222 received from the corresponding longest-match recognizer 240, and the longest-match multiplexer 250 provides a number of multiplexer output words 232 equal to the number of non-null recognizer output words 222.

In the example shown in FIG. 5, a particular subset of the longest-match recognizer 240 generates sets of recognizer output words 222 corresponding to IP header format, and those longest-match multiplexers 250 collect the non-null recognizer output words 222 so as to generate a set of information for routing lookup. For IP routing, this set of information preferably comprises the source IP address (equal in the example shown in FIG. 5 to the value hexadecimal 81 2B 25 5C) and the destination IP address (equal in the example shown in FIG. 5 to the value hexadecimal 80 10 05 1F). Because the number of bits used for IP lookup is variable, there will be a plurality of (preferably about six) longest-match recognizers 240 in the particular subset for IP header format.

In a preferred embodiment in which IP multicast routing is also performed, in the particular subset of the longest-match recognizers 240 which generate sets of recognizer output words 222 corresponding to IP multicast header format, the source IP address and the destination IP address are used for (s, g) routing lookup and the destination IP address is used for (*, g) routing lookup. Thus there are two longest-match recognizers 240 in the particular subset for IP multicast header format.

In a preferred embodiment in which TAG switching routing is also performed, the number of bits used in the lookup is constant, so there is only a single longest-match recognizer 240 in the particular subset for TAG switching header format.

The lookup element 131 is coupled to the m longest-match multiplexers 250, and generates the routing results 114, which are coupled to the rewrite element 150, and a set of routing statistics 265, which are coupled to a statistics collection point 266.

In a preferred embodiment, the lookup element 131 is that shown and described in application Ser. No. 08/917,654, filed the same day, Express Mail Mailing No. EM266118235US, in the name of the same inventor, titled "Multiple Parallel Packet Routing Lookup", and in application Ser. No. 08/918,506, filed the same day, Express Mail Mailing No. EM571204544US, in the name of the same inventor, titled "Enhanced Internet Packet Routing Lookup", both applications of which are hereby incorporated by reference as if fully set forth herein.

In a preferred embodiment (as described in incorporated applications CIS-020B and CIS-020C), the lookup element 131 includes an external memory for storing routing lookup tables comprising a set of routing lookup entries, a hashing element for generating a hash key for indexing to the routing lookup tables, a comparison element for comparing corresponding routing lookup entries with actual routing information (such as for example the destination IP address from the packet 111, and an IP route from a routing protocol), and a memory controller for controlling transfer of hash keys to the external memory and transfer of routing lookup entries from the external memory.

However, in alternative embodiments, the lookup element 131 may comprise any lookup element capable of determining the routing results 114 responsive to packet header information, such as the following:

lookup elements found in known routing devices;

lookup elements described in U.S. Pat. No. 5,509,006, "Apparatus and Method for Switching Packets Using Tree Memory", issued Apr. 16, 1996, in the name of inventor Bruce A. Wilford, and assigned to cisco Systems, Inc., attorney docket number CIS-001; or lookup elements described in U.S. application Ser. No. 08/655,429, "Network Flow Switching and Flow Data Export", filed May 28, 1996, in the name of inventors Darren Kerr and Barry Bruins, and assigned to cisco Systems, Inc., attorney docket number CIS-016, or in U.S. application Ser. No. 08/771,438, having the same title, filed Dec. 19, 1996, in the name of the same inventors, assigned to the same assignee, attorney docket number CIS-017.

In such alternative embodiments, the lookup element 131 may be disposed for receiving more than one set of packet header information for lookup, such as the m sets of multiplexer output words 232 from the m longest-match multiplexers 250.

Recognizer Element

FIG. 3 shows a recognizer element for a multiprotocol packet recognizer and switcher.

The recognizer elements 221 each include an input port 300, a set of masks 310, an expected-word value 320, an instruction word 330 (received from the recognizer instructions 260), and an output port 340.

The input port 300 is coupled to a set of inputs. For the encapsulation recognizers 220 these inputs each include one corresponding word 301 of the packet buffer 210; for the longest-match recognizers 240 these inputs include one corresponding multiplexer output word 232 from the encapsulation multiplexer 230 and a valid bit 302.

The inputs are each masked in response to control by an instruction word 330 by a set of mask values input from the masks 310. In a preferred embodiment, there is at least one global mask which is applied as one of the masks 310 to each of the recognizer elements 221.

The inputs are each compared with the expected-word value 320 under control of the instruction word 330. A result of the comparison is output from the recognizer element 221 as an accept value 345 (described herein). An output field 334 of the instruction word 330 is performed in response to the result of the comparison, and can cause an output word to be generated for the recognizer element 221.

The instruction word 330 includes a checksum field 331, an up field 332, an accept field 333, and an output field 334.

The checksum field 331 indicates whether the input word 301 is transmitted to the checksum element 270.

The up field 332 indicates whether the packet 111 should be handled by an exception handler at a higher software level. If the up field 332 is asserted and the accept field 333 does not indicate acceptance of the inputs, the packet 111 is passed "up" to the processor 133 for exceptional handling.

The accept field 333 indicates under what conditions the inputs are accepted by the recognizer element 221. The accept field 333 comprises an entry indicating an operation and a comparison to be performed on the inputs (PB), the mask value (MO), and the expected word value (EV). In a preferred embodiment, the accept field 333 can indicate one of the following entries:

NO or YES.

The inputs are never accepted ("NO") or always accepted ("YES").

Equal (Masked 1), Equal (Masked 2)

The inputs are masked with one of the two global mask values ("Masked 1" or "Masked 2") and compared for equality with the expected-word value.

Equal, Less-Than, Greater-Than, Not-Equals

The unmasked inputs are compared with the expected-word value; the comparison is accepted if the inputs are correspondingly equal to, less than, or greater than, the expected-word value.

The output field 334 indicates an output word from the output port 340. The output field 334 comprises an entry indicating a value or combination of values to be output, if the accept field 333 indicates that the inputs are accepted by the recognizer element 221. In a preferred embodiment, the output field 334 can indicate one of the following entries:

Nothing.

An output value at the output port is undefined and a valid entry at the output port is set to INVALID.

Input Value (PB).

The output value is equal to the input value, and the valid entry is set to VALID.

Expected-Word Value (EV).

The output value is equal to the expected-word value, and the valid entry is set to VALID.

Combination of Input Value and Expected-Word Value (PB & EV).

The output value is equal to the logical AND of the input value and the expected-word value, and the valid entry is set to VALID.

The output port 340 includes an output value 341, a valid entry 342, a checksum value 343, an up value 344, and an accept value 345. The output value 341 and the valid entry 342 are generated as shown above with reference to the output field 334. The checksum value 343 is generated as shown above with reference to the checksum element 270 and the checksum field 331. The up value 344 is generated as shown above with reference to the up field 332.

The accept value 345 is generated as shown above with reference to the accept field 333, and indicates that the particular recognizer element 221 has met its comparison test. The encapsulation recognizer 220 and each longest-match recognizer 240 each accept a packet header only when all their corresponding recognizer elements 221 have their accept values 345 simultaneously asserted.

Multiplexer Element

FIG. 4 shows a multiplexer for a multiprotocol packet recognizer and switcher.

The multiplexer elements 231 for the encapsulation multiplexer 230 or the longest-match multiplexer 250 are each disposed in an array of rows 410. A first row 410 includes one less multiplexer element 231 than a number of input recognizer output words 222. Each successive row 410 includes one fewer multiplexer element 231. A final row 410 includes one multiplexer element 231 for each output multiplexer output word 232.

Each multiplexer element 231 has a corresponding right neighbor multiplexer element 231 (in the same row 410), a corresponding left neighbor multiplexer element 231 (in the same row 410), two corresponding top neighbor multiplexer elements 231 (in an earlier row 410), and two corresponding down neighbor multiplexer elements 231 (in a later row 410), except for multiplexer elements 231 at borders of the array.

Each multiplexer element 231 includes a left data input 400, a right data input 401, a left valid input 402, a right valid input 403, a data output 404, a valid output 405, a left-full input 406, and a left-full output 407.

The left data input 400 and the right data input 401 are coupled to the data outputs 404 for two corresponding top neighbor multiplexer elements 231. For a top row of multiplexer elements 231, the left data input 400 and the right data input 401 are instead coupled to corresponding recognizer output words 222. The left valid input 402 and the right valid input 403 are similarly coupled to the valid outputs 405 for the same two corresponding top neighbor multiplexer elements 231.

The data output 404 is coupled to the left data input 400 and the right data input 401 for two corresponding down neighbor multiplexer elements 231. For a bottom row of multiplexer elements 231, the data output 404 is coupled to a multiplexer output word 232 for the encapsulation multiplexer 230 or for the longest-match multiplexer 250. Similarly, the valid output 405 is coupled to the left valid input 402 and the right valid input 403 for two corresponding down neighbor multiplexer elements 231.

Each row of multiplexer elements 231 operates to transfer valid data inputs toward the left side for the next row, so that at the bottom row of multiplexer elements 231, all valid data inputs have been collected at the left side, and all other entries indicate lack of valid data.

Thus, for multiplexer elements 231 at the leftmost position of any row 410, if either the left valid input 402 or the right valid input 403 is asserted, the valid output 405 is asserted. If the left data input 400 has valid data (that is, the left valid input 402 is asserted), that valid data is output at the data output 404, and the left-full output 407 is asserted. Otherwise, if the right data input 401 has valid data (that is, the right valid input 403 is asserted), that valid data is output at the data output 404, and the left-full output 407 is not asserted.

For multiplexer elements 231 which are not at the leftmost position of any row 410, if the left-full input 406 is asserted, the multiplexer element 231 performs similarly to those multiplexer elements 231 at the leftmost position of any row 410 (because all multiplexer elements 231 further left are "full"). If the left-full input 406 is not asserted, the multiplexer element 231 transmits the data from its right data input 401 to its data output 404 and transmits the signal from its right valid input 403 to its valid output 405.

Each multiplexer element 231 asserts its left-full output 407 if and only if its left-full input 406 and its left valid input 402 are both asserted. Each multiplexer element 231 asserts its valid output 405 if either its left-full output 407 is asserted or its right valid input 403 is asserted.

Alternative Embodiments

Although preferred embodiments are disclosed herein, many variations are possible which remain within the concept, scope, and spirit of the invention, and these variations would become clear to those skilled in the art after perusal of this application.

What is claimed is:

1. A method, including the steps of:

receiving a packet header including header information at selected words of the packet header;

applying in parallel a first set of words of said packet header to a first plurality of header information recognizers, and selecting a second set of words of said packet header in response thereto, said second set of words being a subset of said first set of words;

applying in parallel said second set of words to a second plurality of header information recognizers, and selecting a packet treatment identifier in response thereto; and using said packet treatment identifier to access a memory having information regarding treatment of packets.

2. A method as in claim 1, wherein each said header information recognizer includes a first word having a value for matching to a corresponding word of said packet header; and a second word having an instruction for execution responsive to said matching.

3. A method according to claim 1, including the step of transforming said second set of words into a compact set of header information.

4. A method as in claim 1, wherein said header information includes a destination address for the packet plus either a sending address, an input interface, or a number of bits matched for the destination address.

5. A method according to claim 1, wherein said first plurality of header information recognizers comprise a plurality of encapsulation recognizers.

6. A method according to claim 1, wherein said second set of words is selected at least in part by an encapsulation multiplexer.

7. A method according to claim 1, wherein said second plurality of header information recognizers comprise a plurality of longest match recognizers.

8. A method according to claim 1, wherein said packet treatment identifier is selected at least in part by a plurality of longest match multiplexers.

9. An apparatus for accessing information regarding treatment of packets, each packet having a packet header, each packet header including header information at selected words of said packet header, said apparatus comprising:

a first plurality of header information recognizers to which a first set of words of said packet header is applied in parallel; and a second plurality of header information recognizers to which a second set of words is applied in parallel, said second set of words selected in response to recognition by said first plurality of header information recognizers, said second set of words being a subset of said first set of words; and a memory having information regarding treatment of packets which is accessed using a packet treatment identifier, said packet treatment identifier selected in response to recognition by said second plurality of header information recognizers.

10. An apparatus according to claim 9, wherein each said header information recognizer includes:

a first word having a value for matching a corresponding word of said packet header; and a second word having an instruction for execution responsive to said matching.

11. An apparatus according to claim 9, wherein said second set of words is transformed into a compact set of header information.

12. An apparatus according to claim 9, wherein said header information includes a destination address for the packet plus either a sending address, an input interface, or a number of bits matched for the destination address.

13. An apparatus according to claim 9, wherein said first plurality of header information recognizers comprise a plurality of encapsulation recognizers.

14. An apparatus according to claim 9, further comprising an encapsulation multiplexer, wherein said second set of words is selected at least in part by said encapsulation multiplexer.

15. An apparatus according to claim 9, wherein said second plurality of header information recognizers comprise a plurality of longest match recognizers.

16. An apparatus according to claim 9, further comprising a plurality of longest match multiplexers, wherein said packet treatment identifier is selected at least in part by said plurality of longest match multiplexers.

* * * * *